(12) United States Patent
Wang et al.

(10) Patent No.: US 11,849,735 B2
(45) Date of Patent: Dec. 26, 2023

(54) MARGARINE SUBSTITUTE LOADED WITH TRANS-RESVERATROL/GLYCOSIDE AND PREPARATION METHOD THEREOF

(71) Applicant: Institute of Food Science and Technology, Chinese Academy of Agricultural Sciences, Beijing (CN)

(72) Inventors: Qiang Wang, Beijing (CN); Aimin Shi, Beijing (CN); Bo Jiao, Beijing (CN); Li Liu, Beijing (CN); Hui Hu, Beijing (CN); Hongzhi Liu, Beijing (CN)

(73) Assignee: FOOD SCIENCE AND TECHNOLOGY, CHINESE ACADEMY OF AGRICULTURAL SCIENCE, Beijing (CN)

( * ) Notice: Subject to any disclaimer, the term of this patent is extended or adjusted under 35 U.S.C. 154(b) by 876 days.

(21) Appl. No.: 16/486,078

(22) PCT Filed: Feb. 28, 2019

(86) PCT No.: PCT/CN2019/076410
§ 371 (c)(1),
(2) Date: Aug. 14, 2019

(87) PCT Pub. No.: WO2020/077932
PCT Pub. Date: Apr. 23, 2020

(65) Prior Publication Data
US 2021/0360940 A1 Nov. 25, 2021

(30) Foreign Application Priority Data
Oct. 19, 2018 (CN) .......................... 201811223755.2

(51) Int. Cl.
*A23D 7/005* (2006.01)
*A23D 7/04* (2006.01)
*A23J 3/14* (2006.01)

(52) U.S. Cl.
CPC ............. *A23D 7/0053* (2013.01); *A23D 7/04* (2013.01); *A23J 3/14* (2013.01)

(58) Field of Classification Search
CPC .......... A23D 7/00; A23D 7/001; A23D 7/003; A23D 7/005; A23D 7/0053; A23D 7/0056; A23D 7/04; A23D 7/02
See application file for complete search history.

(56) References Cited

U.S. PATENT DOCUMENTS

| 4,038,436 A * | 7/1977 | Smouse ................. A23D 7/003 426/603 |
| 4,279,941 A * | 7/1981 | Bosco ................. A23D 7/0053 426/604 |
| 2005/0233056 A1* | 10/2005 | Jahaniaval ............. A23D 7/013 426/603 |
| 2009/0012183 A1* | 1/2009 | Draijer ................... A23D 7/013 514/733 |

FOREIGN PATENT DOCUMENTS

| CN | 101569343 A | 11/2009 |
| CN | 102919388 A | 2/2013 |
| CN | 107455550 A | 12/2017 |

OTHER PUBLICATIONS

Guo et al., "Preparation of soy protein-based microgel particles using a hydrogel homogenizing strategy and their interfacial properties", 2016, Food Hydrocolloids, vol. 58, pp. 324-334 (Year: 2016).*
O'Sullivan, J.J., "Applications of Ultrasound for the Functional Modification of Proteins and Submicron Emulsion Fabrication", 2015, The University of Birmingham School of Chemical Engineering (Year: 2015).*
Ma et al., "Rapid determination of trans-resveratrol in vegetable oils using magnetic hydrophilic multi-walled carbon nanotubes as adsorbents followed by liquid chromatography-tandem mass spectrometry", 2015, Food Chemistry, vol. 178, pp. 259-266 (Year: 2015).*

(Continued)

*Primary Examiner* — Jeffrey P Mornhinweg
*Assistant Examiner* — Kelly P Kershaw
(74) *Attorney, Agent, or Firm* — John P. White

(57) ABSTRACT

The present invention relates to a margarine substitute loaded with trans-resveratrol/glycoside and a preparation method thereof. The preparation method comprises the following steps: (1) preparing a peanut protein dispersion, adding a transglutaminase thereto, performing a cross-linking reaction under a water bath condition, and heating up to obtain a monolithic gel; continuing to add water to the monolithic gel, shearing the resultant at a high speed, homogenizing at a high pressure, performing ultrasonication, and adjusting pH to obtain a microgel particle dispersion; (2) adding a trans-resveratrol/glycoside to an edible oil in the dark, stirring well, continuing to add the microgel particle dispersion obtained in step (1), and shearing the resultant at a high speed to obtain a high internal-phase Pickering emulsion, i.e. a margarine substitute loaded with trans-resveratrol/glycoside. The trans-resveratrol/glycoside in the margarine substitute loaded with trans-resveratrol/ glycoside of the present invention maintains relatively high activity and can solve a series of industrial problems brought by trans fat.

12 Claims, 3 Drawing Sheets

(56) References Cited

OTHER PUBLICATIONS

Liu et al., "Effect of denaturation during extraction on the conformational and functional properties of peanut protein isolate", 2011, Innovative Food Science and Emerging Technologies, vol. 12, pp. 375-380 (Year: 2011).*
("Hydraulic Diameter", 2012, Neutrium, https://neutrium.net/fluid-flow/hydraulic-diameter/ (Year: 2012).*
Lee, L., Norton, I.T., "Comparing droplet breakup for a high-pressure valve homogenizer and a Microfluidizer for the potential production of food-grade nanoemulsions", 2013, Journal of Food Engineering, vol. 114, pp. 158-163 (Year: 2013).*
Kim et al., "Processable high internal phase Pickering emulsions using depletion attraction", 2017, Nature Communications 8, 14305 doi: 10.1038/ncomms14305 (Year: 2017).*
Yang et al., "An Overview of Pickering Emulsions: Solid—Particle Materials, Classification, Morphology, and Applications", 2017, Frontiers in Pharmacology, vol. 8, article 287 (Year: 2017).*
Sanfelice, D., Temussi, P.A., "Cold denaturation as a tool to measure protein stability", 2016, Biophysical Chemistry, vol. 208, pp. 4-8 (Year: 2016).*
Vinchhi et al., "Chapter 11 High-Pressure Homogenization Techniques for Nanoparticles", 2021, Emerging Technologies for Nanoparticle Manufacturing, pp. 263-285, https://doi.org/10.1007/978-3-030-50703-9_11 (Year: 2021).*
International Search Report dated May 23, 2019 in connection with PCT International Application No. PCT/CN2019/076410.
Written Opinion (form PCT/ISA/237) dated May 23, 2019 in connection with PCT International Application No. PCT/CN2019/076410.

* cited by examiner

US 11,849,735 B2

MARGARINE SUBSTITUTE LOADED WITH TRANS-RESVERATROL/GLYCOSIDE AND PREPARATION METHOD THEREOF

CROSS-REFERENCE TO RELATED APPLICATION

The present application is a § 371 national stage of PCT International Application No. PCT/CN2019/076410, filed Feb. 28, 2019, claiming priority of Chinese Patent Application No. 201811223755.2, filed Oct. 19, 2018, the contents of each of which are hereby incorporated by reference into the application.

TECHNICAL FIELD

The present invention relates to a margarine substitute loaded with trans-resveratrol/glycoside and a preparation method thereof, and belongs to the technical field of food processing.

BACKGROUND ART

Resveratrol is a natural polyphenolic substance mainly derived from plants such as peanuts and *Polygonum cuspidatum*, and has important physiological functions, such as anti-oxidation and anti-tumor functions. Resveratrol glycoside, a derivative of resveratrol, can release resveratrol under the action of glycosidase in the gut and exerts its biological activity.

Resveratrol and resveratrol glycoside in plants mainly exist in form of a trans-structure, but studies have shown that the trans-structure is easily converted into a cis-structure having low-activity under irradiation. Therefore, how to effectively add and maintain high activity thereof in food systems is an important problem in the field of food science.

SUMMARY OF THE INVENTION

In order to solve the above technical problems, the present invention provides a margarine substitute loaded with trans-resveratrol/glycoside and a preparation method thereof, wherein the trans-resveratrol/glycoside maintains high activity and can solve a series of industrial problems brought by trans fat.

The technical solution adopted by the present invention is as follows.

A method for preparing a margarine substitute loaded with trans-resveratrol/glycoside, comprising the following steps:

(1) preparing a peanut protein dispersion, adding a transglutaminase thereto, performing a cross-linking reaction under a water bath condition, and heating up to obtain a monolithic gel; continuing to add water to the monolithic gel, shearing the resultant at a high speed, homogenizing under a high pressure, performing ultrasonication, and adjusting pH to obtain a microgel particle dispersion; and (2) adding a trans-resveratrol/glycoside to an edible oil in the dark, stirring well, continuing to add the microgel particle dispersion obtained in step (1), and shearing the resultant at a high speed to obtain a high internal-phase Pickering emulsion, that is, a margarine substitute loaded with trans-resveratrol/glycoside.

In the above step (1), a method for preparing the peanut protein dispersion comprises the following steps: subjecting a peanut protein isolate powder to alkali dissolution and acid precipitation to obtain a peanut protein isolate having a protein content of 89% to 98%, and performing hydration to obtain a peanut protein dispersion having a mass concentration of 3% to 25%; preferably, the peanut protein dispersion has a mass concentration of 17% to 23%.

Wherein, the peanut protein isolate powder is commercially available (for example, it can be purchased from Gaotang Lanshan Co., Ltd.).

In the above step (1), in order to obtain a better dispersion effect, the peanut protein dispersion is heated in a water bath at 60 to 90° C. for such as 20 to 35 min; preferably, the temperature of the water bath is 70 to 85° C.

In the above step (1), the transglutaminase is added in an amount of 12 to 40 U/g peanut protein isolate; preferably 12 to 20 U/g.

In the above step (1), the cross-linking reaction is performed under the following condition: a water bath at 38 to 47° C., preferably a water bath at 42 to 47° C.; and the resultant is heated at 90 to 100° C. after the cross-linking reaction is completed, to obtain a monolithic gel.

In the above step (1), the high-speed shearing is performed at a speed of 10,000 to 11,000 rpm. The high-pressure homogenization is performed at a pressure of 1,100 bar to 1,400 bar, preferably 1,100 bar to 1,200 bar; and the ultrasonication is performed at a power of 150 to 300 W, preferably 200 to 280 W.

In the above step (1), the obtained microgel particle dispersion has a hydraulic diameter of 100 to 300 nm. The microgel particle dispersion has the advantages of stable system, small particle size and the like, and is helpful for replacing the traditional emulsifier to adsorb on the oil-water interface, and stabilizing the system in the manner of Pickering emulsion.

In the above step (1), the obtained microgel particle dispersion has a pH of 2 to 4 or 8 to 10.

In the above step (2), the edible oil is selected from one or more of soybean oil, rapeseed oil, sunflower oil, and peanut oil (high temperature squeezed or low temperature squeezed), which contain no trans fat, preferably peanut oil (low temperature squeezed), so as to prepare a more ideal Pickering emulsion.

In the above step (2), the concentration of the trans-resveratrol/glycoside in the edible oil is 80 to 150 μg/mL, preferably 90 to 110 μg/mL.

In the above step (2), the high-speed shearing is performed at a speed of 2,000 to 4,000 rpm.

As one of the preferred embodiments of the present invention, the method for preparing a margarine substitute loaded with trans-resveratrol/glycoside comprises the following steps:

(1) preparing a peanut protein isolate solution having a mass concentration of 17% to 23%, fully stirring the resultant and refrigerating overnight to fully hydrate the protein to obtain a peanut protein dispersion;

(2) heating the peanut protein dispersion obtained in the step (1) in a water bath at 70 to 85° C. for 20 to 25 min, cooling to room temperature, adding transglutaminase in an amount of 12 to 20 U/g peanut protein isolate, carrying out cross-linking reaction in a water bath at 42 to 47° C., and heating the resultant at 90 to 100° C. for 18 to 25 min after the reaction is completed, to obtain a monolithic gel;

(3) adding water in an amount that is 1 times as much as the mass of the monolithic gel to the monolithic gel, shearing the resultant at a high speed of 10,000 rpm for 30 seconds to 120 seconds to obtain a microgel particle coarse dispersion; and then homogenizing the coarse dispersion at a high pressure of 1,100 bar to 1,200 bar for 1 to 2 min, carrying out ultrasonication at 200 to 280 w for 15 to 25 min to obtain a microgel particle dispersion; and adjusting the pH of the microgel particle dispersion to 2 to 4 or 8 to 10;

(4) adding a trans-resveratrol/glycoside in an amount of 90 to 110 μg/mL to an edible oil in the dark; and (5) adding the microgel particle dispersion obtained in step (3) to the mixture obtained in step (4), such that the particle concentration is 1 to 2% based on the concentration of the peanut protein isolate, and a mass fraction of 80% to 87% of the oil phase is ensured; and shearing the resultant at a high speed of 2,000 to 4,000 rpm for 20 to 120 seconds to give a high internal-phase Pickering emulsion.

The present invention also provides a margarine substitute (i.e., a high internal-phase Pickering emulsion) prepared by the above method. In the high internal-phase Pickering emulsion, the concentration of the peanut protein isolate is 0.5% to 2%, preferably 1% to 2%; and the mass fraction of the oil phase is 74% to 87%, preferably 80% to 87%. Within this range, the emulsion is in the range of a high internal-phase Pickering emulsion and its functional properties are more similar to margarine.

Experiments show that the Pickering emulsion prepared by the present invention has a particle diameter of 1 to 60 μm, and the particle-stable emulsion with a pH of 3.0 has a particle size of 1 to 30 μm, and its structure is adjustable and can be applied to different types of margarine substitute.

The beneficial effects achieved by the technical solution of the present invention are as follows:

(1) The aggregation morphology of peanut protein microgel particles is adjusted by pH, thereby stabilizing the high internal-phase Pickering emulsion;

(2) The high internal-phase emulsion can be used as a substitute for margarine to solve a series of industrial problems brought by trans fat;

(3) The Pickering emulsion of the present invention is used as a carrier so as to maintain a high activity of the trans-resveratrol/glycoside.

SPECIFIC MODES FOR CARRYING OUT THE EMBODIMENTS

The following Examples are intended to illustrate the present invention, but are not intended to limit the scope of the present invention.

Example 1

The present Example provides a method for preparing a margarine substitute, and the specific steps were as follows:

a) a peanut protein isolate solution having a mass concentration of 17% was prepared, fully stirred and then refrigerated overnight to fully hydrate the protein to obtain a peanut protein dispersion;

b) the peanut protein dispersion obtained in a) was heated in a water bath at 70° C. for 20 min, cooled to room temperature, and then added with transglutaminase in an amount of 12 U/g peanut protein isolate, and cross-linking reaction was performed in a water bath at 42° C., after the reaction was completed, and then the resultant was heated at 90° C. for 18 min to obtain a monolithic gel;

c) the monolithic gel was added with water in an amount that was 1 times as much as the mass of the monolithic gel, and sheared using a high-speed disperser at a high speed of 10,000 rpm for 30 seconds to obtain a coarse dispersion of microgel particles, and then the coarse dispersion was subjected to high-pressure homogenization using a high pressure homogenizer under a pressure of 1,100 bar for 1 min and ultrasonication at 210 W for 15 min to obtain a microgel particle dispersion; and the pH of the mirogel particle dispersion was adjusted to 3.

d) a trans-resveratrol was added in an amount of 100 μg/mL to an edible oil in the dark; and e) the microgel particle dispersion obtained in step c) was added to the edible oil of step d), in such an amount that the particle concentration was 1% based on the concentration of the peanut protein isolate, and the mass fraction of the oil phase was 80%; and the resultant was sheared at a high speed of 2,000 rpm for 20 seconds to give a high internal-phase Pickering emulsion.

Figure 1:
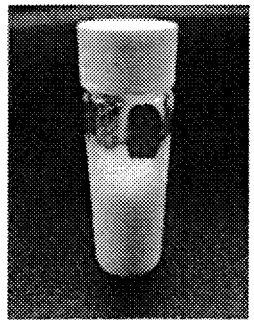
FIG. 1 is a photograph showing the appearance of a Pickering emulsion prepared in Example 1.

Investigation of Performance:

The margarine substitute prepared in the present Example was shown in FIG. 1.

Figure 2:
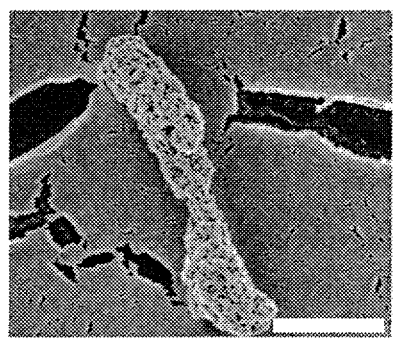
FIG. 2 is a photograph of cryogenic scanning electron microscope of the peanut protein microgel particles of Example 1.

The aggregation state of the peanut protein microgel particles was shown in FIG. 2.

The emulsion has a particle size of 5 to 50 μm.

The rheological properties of the margarine substitute obtained in Example 1 and the commercially available margarine were measured and compared, and fitted using the Cross model. The results, as shown in Table 1, indicate that the sample of the present Example has no significant difference in Newtonian properties as compared with the commercially available margarines 1 and 2, and can be used as a premium substitute for margarine.

The margarine substitute obtained in Example 1 was compared with a low-temperature squeezed peanut oil loaded with trans-resveratrol:

When the low-temperature squeezed peanut oil loaded with trans-resveratrol was irradiated with 365 nm ultraviolet lamp, the content of trans-resveratrol was rapidly reduced by 80.5% after irradiation for 15 min, and when the irradiation time was extended to 90 min, the content of trans-resveratrol in the system was reduced by 88.4%.

The content of trans-resveratrol in the margarine substitute obtained in Example 1 was hardly changed under exposure to ultraviolet.

Figure 3:
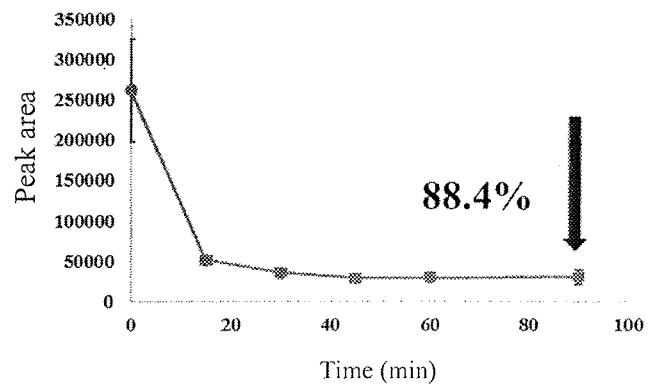
FIG. 3 is a graph showing the anti-ultraviolet stabilities of resveratrol in an edible oil (a) and in the margarine substitute of the present invention (b) in Example 1.

The anti-ultraviolet stabilities of resveratrol in an edible oil (a) and in the margarine substitute of the present invention (b) in Example 1 were shown in FIG. 3.

Example 2

This Example provides a method for preparing a margarine substitute, and the specific steps are as follows:

a) a peanut protein isolate solution having a mass concentration of 23% was prepared, fully stirred and then refrigerated overnight to fully hydrate the protein to obtain a peanut protein dispersion;

b) the peanut protein dispersion obtained in a) was heated in a water bath at 85° C. for 25 min, cooled to room temperature, and then added with transglutaminase in an amount of 20 U/g peanut protein isolate, and cross-linking reaction was performed in a water bath at 47° C., after the reaction was completed, the resultant was heated at 100° C. for 25 min to obtain a monolithic gel;

c) the monolithic gel was added with water in an amount that was 1 times as much as the mass of the monolithic gel, and sheared using a high-speed disperser at a high speed of 10,000 rpm for 120 seconds to obtain a microgel particle coarse dispersion, and then the coarse dispersion was subjected to high-pressure homogenization using a high pressure homogenizer under a pressure of 1,200 bar for 2 min and ultrasonication at 280 W for 25 min to obtain a microgel particle dispersion; and the pH of the microgel particle dispersion was adjusted to 9.

d) a trans-resveratrol glycoside was added in an amount of 100 μg/mL to an edible oil in the dark; and e) the microgel particle dispersion obtained in step c) was added to the edible oil of step d), in such an amount that the particle concentration was 2% based on the concentration of the peanut protein isolate, and the mass fraction of the oil phase was 87%; and the resultant was sheared at a high speed of 4,000 rpm for 120 seconds to give a high internal-phase Pickering emulsion.

Figure 4:
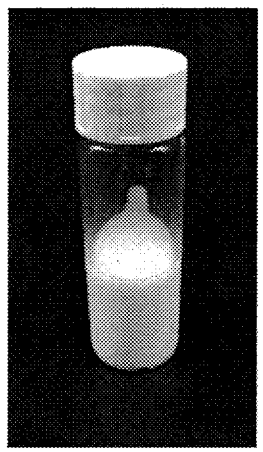
FIG. 4 is a photograph showing the appearance of a Pickering emulsion prepared in Example 2.

Investigation of Performance:

The margarine substitute prepared in the present Example was shown in FIG. 4.

Figure 5:
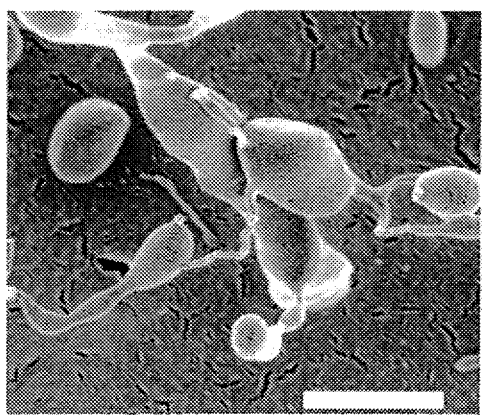
FIG. 5 is a photograph of cryogenic scanning electron microscope of the peanut protein microgel particles of Example 2.

The aggregation state of the peanut protein microgel particles was shown in FIG. 5.

The emulsion has a particle size of 5 to 50 μm.

Figure 6:
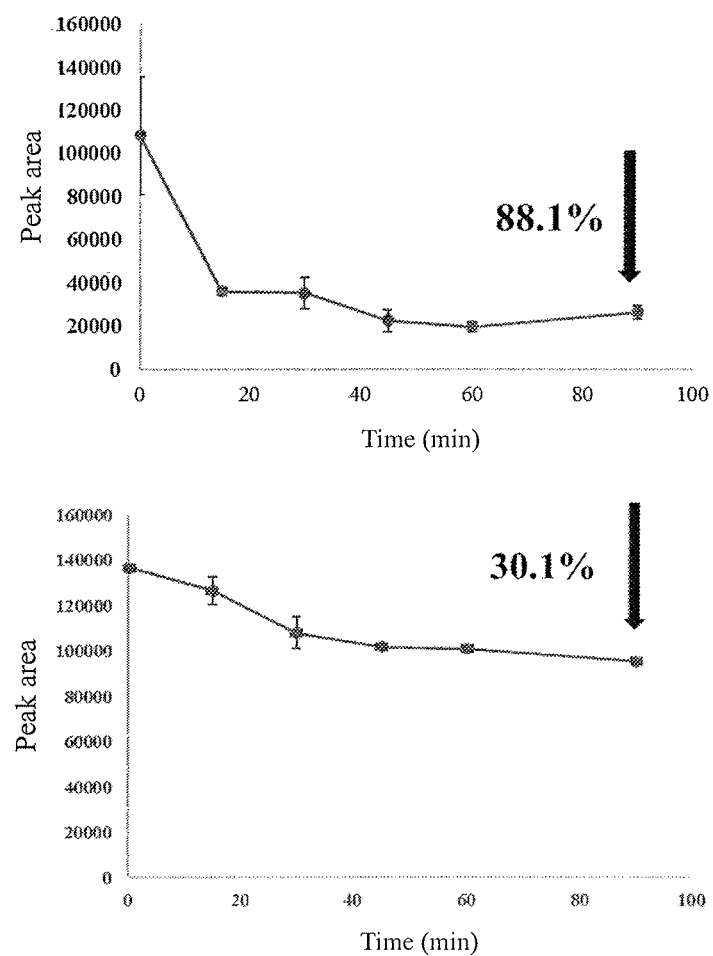
FIG. 6 is a graph showing the anti-ultraviolet stabilities of resveratrol in an edible oil (a) and in the margarine substitute (b) in Example 2.

The anti-ultraviolet stabilities of resveratrol in an edible oil (a) and in the margarine substitute (b) in Example 2 were shown in FIG. 6.

The rheological properties of the margarine substitute obtained in Example 2 and the commercially available margarine were measured and compared, and fitted using the Cross model. The results, as shown in Table 1, indicate that the sample of the present Example has no significant difference in Newtonian properties as compared with the commercially available margarines 3 and 4, and can be used as a premium substitute to margarine.

The margarine substitute obtained in Example 2 was compared with a low-temperature squeezed peanut oil loaded with trans-resveratrol glycoside:

After the low-temperature squeezed peanut oil loaded with trans-resveratrol glycoside was exposed under 365 nm ultraviolet for 90 min, the content of trans-resveratrol glycoside was reduced by 88.1%.

Under the same conditions, the reduction of the content of trans-resveratrol glycoside in the margarine substitute obtained in Example 2 was 30.1%. The margarine substitute can effectively reduce the loss of trans-resveratrol glycoside.

Comparative Example 1

Chinese application NO. 201611004761.X discloses a high internal-phase gelatinous zein Pickering emulsion and a preparation method thereof. The high internal-phase Pickering emulsion was stabilized by using zein-pectin composite particles. The organic solvent ethanol was used during the preparation of the emulsion. If the emulsion was used as a substitute for margarine, the problem of solvent residue will become an issue that must be considered in the industry, and the solvent removal process will increase production cost; and its pH range was acidic (3.0 to 5.0).

Comparative Example 2

Chinese application NO. 201611009575.5 discloses a high internal-phase gelatinous wheat gliadin Pickering emulsion and a preparation method thereof. The high internal-phase Pickering emulsion was stabilized using wheat gliadin-chitosan composite particles. The use of protein-polysaccharide composite particles during the preparation of the emulsion increases the preparation cost, and the organic solvent ethanol was used during the preparation of the emulsion. If the emulsion was used as a substitute for margarine, the problem of solvent residue will become an issue that must be considered in the industry, and the solvent removal process added during the production process will increase production cost.

The solvent of the dispersion in the margarine substitute obtained by the present invention was water, and no organic solvent was used during the preparation process, and thus the present invention has advantages in safety and cost. Furthermore, the pH range of the present invention can be acidic and alkaline, resulting in a broader application range.

TABLE 1

| Samples | Cross model parameters | |
|---|---|---|
| | m (dimensionless constant) | $R^2$ |
| Example 1 | $2.05^a$ | 0.998 |
| Example 2 | $1.18^c$ | 0.999 |
| Commercially available margarine 1 | $1.72^{ab}$ | 0.999 |
| Commercially available margarine 2 | $1.86^{ab}$ | 0.999 |
| Commercially available margarine 3 | $1.34^{bc}$ | 0.999 |
| Commercially available margarine 4 | $1.07^c$ | 0.999 |

Note:
Different letter superscripts in the same column represent significant differences ($p < 0.05$).

Although the present invention has been described in detail as above with a general description and specific embodiments, it will be apparent to a person skilled in the art that some modifications or improvements can be made on the basis of the present invention. Therefore, such modifications or improvements made without departing from the spirit of the present invention are intended to be within the scope of protection of the present invention.

INDUSTRIAL APPLICABILITY

The present invention provides a margarine substitute loaded with trans-resveratrol/glycoside. The margarine substitute loaded with trans-resveratrol/glycoside is prepared by the method as follows: (1) preparing a peanut protein dispersion, adding a transglutaminase thereto, performing a cross-linking reaction under a water bath condition, and heating up to obtain a monolithic gel; continuing to add water to the monolithic gel, and shearing the resultant at a high speed, homogenizing under a high pressure, performing ultrasonication, and adjusting pH to obtain a microgel particle dispersion; and (2) adding trans-resveratrol/glycoside to edible oil in the dark, stirring well, continuing to add the microgel particle dispersion obtained in step (1), and shearing the resultant at a high speed to obtain a high internal-phase Pickering emulsion, i.e. a margarine substitute loaded with trans-resveratrol/glycoside. The trans-resveratrol/glycoside in the margarine substitute loaded with trans-resveratrol/glycoside of the present invention maintains relatively high activity, can solve a series of industrial problems brought by trans fat, and has good economic value and application prospect.

What is claimed is:

1. A method for preparing a margarine substitute which comprises a peanut protein particle dispersion and an edible oil which contains added trans-resveratrol and/or added trans-resveratrol glycoside, comprising the following steps:
   (a) (i) preparing a peanut protein dispersion from a peanut protein isolate, (ii) adding a transglutaminase to the peanut protein dispersion, (iii) performing a cross-linking reaction in a water bath on the peanut protein dispersion from step (ii) to obtain a cross-linked reaction product, (iv) heating the cross-linked reaction product from step (iii) to obtain a monolithic gel; (v) adding water to the monolithic gel obtained in step (iv), (vi) shearing the monolithic gel and added water from step (v) at a speed of 10,000 rpm to 11,000 rpm to effect shearing and obtain a sheared, monolithic gel product, (vii) homogenizing the sheared, monolithic gel product obtained from step (vi) at a pressure of 1,100 bar to 1,200 bar to produce a homogenized, sheared, monolithic gel product, (viii) performing ultrasonication on the homogenized, sheared, monolithic gel product from step (vii) to produce an ultrasonicated product comprising a peanut protein particle dispersion, and (ix) adjusting the pH of the ultrasonicated product comprising the peanut protein particle dispersion from step (viii) to obtain a microgel comprising the peanut protein particle dispersion; and
   (b) (i) separately adding (A) trans-resveratrol, (B) trans-resveratrol glycoside, or (C) a mixture of trans-resveratrol and trans-resveratrol glycoside to an edible oil in the dark to produce an edible oil which contains added trans-resveratrol and/or added trans-resveratrol glycoside, and (ii) stirring the edible oil product from step (b)(i) to obtain a homogenous edible oil product;
   (c) (i) adding the microgel comprising the peanut protein particle dispersion obtained in step (a) (ix) to the homogeneous edible oil product obtained in step (b) (ii) to obtain a mixture, and (ii) shearing the resulting mixture from step (c)(i) at a speed sufficiently high to obtain a high internal-phase Pickering emulsion, which emulsion is the margarine substitute which comprises the peanut protein particle dispersion and the edible oil which contains added trans-resveratrol and/or added trans-resveratrol glycoside;
   wherein in the step (a) (viii) the ultrasonication is performed at a power of 200 W to 280 W;
   wherein the method for preparing the peanut protein dispersion in step (a) (i) comprises the following steps: (A) subjecting a peanut protein powder to alkali dissolution and acid precipitation to obtain a peanut protein isolate having a peanut protein mass fraction of 89% to 98%, and (B) treating the peanut protein isolate produced in (A) to obtain a peanut protein dispersion comprising peanut protein at a mass fraction of 17% to 23%; and
   wherein in the step (a)(iii), the cross-linking reaction is performed under the following conditions: in a water bath at 42° C. to 47° C. to obtain the cross-linked reaction product; and in the step (a)(iv), the cross-linked reaction product is heated at 90° C. to 100° C. after the cross-linking reaction is completed to obtain the monolithic gel.

2. The method of claim 1, wherein in step (a) (ii), 12 to 40 U transglutaminase per gram is added to the amount in grams of the peanut protein dispersion which corresponds to the amount in grams of the peanut protein isolate from which the peanut protein dispersion was obtained.

3. The method of claim 1, wherein in step (a) (ix), the particles in the microgel comprising the peanut protein particle dispersion have a hydrodynamic diameter of 100 nm to 300 nm; and the pH is adjusted to a pH of 2 to 4 or to a pH of 8 to 10.

4. The method of claim 1, wherein in step (c) (ii), the shearing is performed at a speed of 2,000 rpm to 4,000 rpm.

5. A margarine substitute comprising added trans-resveratrol and/or added trans-resveratrol glycoside prepared by the method of claim 1, wherein in the high internal-phase Pickering emulsion which comprises the peanut protein particle dispersion and the edible oil obtained in step (c) (ii), the mass fraction of the peanut protein particle dispersion is 0.5% to 2%; and the mass fraction of the edible oil is 74% to 87%.

6. A margarine substitute comprising added trans-resveratrol and/or added trans-resveratrol glycoside prepared by the method of claim 1, wherein in the high internal-phase Pickering emulsion which comprises the peanut protein particle dispersion and the edible oil obtained in step (c) (ii), the mass fraction of the peanut protein particle dispersion is 1% to 2%; and the mass fraction of the edible oil is 80% to 87%.

7. A method for preparing a margarine substitute which comprises a peanut protein particle dispersion and an edible oil which contains added trans-resveratrol but not added trans-resveratrol glycoside, comprising the following steps:
   (a) (i) preparing a peanut protein dispersion from a peanut protein isolate, (ii) adding a transglutaminase to the peanut protein dispersion, (iii) performing a cross-linking reaction in a water bath on the peanut protein dispersion from step (ii) to obtain a cross-linked reaction product, (iv) heating the cross-linked reaction product from step (iii) to obtain a monolithic gel; (v) adding water to the monolithic gel obtained in step (iv), (vi) shearing the monolithic gel and added water from step (v) at a speed of 10,000 rpm to 11,000 rpm to effect shearing and obtain a sheared, monolithic gel product, (vii) homogenizing the sheared, monolithic gel product obtained from step (vi) at a pressure of 1,100 bar to 1,200 bar to produce a homogenized, sheared, monolithic gel product from step (vii) to produce an ultrasonicated product comprising a peanut protein particle dispersion, and (ix) adjusting the pH of the ultrasonicated product comprising the peanut protein particle dispersion from step (viii) to obtain a microgel comprising the peanut protein particle dispersion; and
   (b) (i) separately adding trans-resveratrol to an edible oil in the dark to produce an edible oil which contains added trans-resveratrol, and (ii) stirring the edible oil product from step (b)(i) to obtain a homogenous edible oil product;
   (c) (i) adding the microgel comprising the peanut protein particle dispersion obtained in step (a) (ix) to the homogeneous edible oil product obtained in step (b) (ii) to obtain a mixture, and (ii) shearing the resulting mixture from step (c)(i) at a speed sufficiently high to obtain a high internal-phase Pickering emulsion, which emulsion is the margarine substitute which comprises the peanut protein particle dispersion and the edible oil which contains added trans-resveratrol;

wherein in the step (a) (viii) the ultrasonication is performed at a power of 200 W to 280 W;

wherein the method for preparing the peanut protein dispersion in step (a) (i) comprises the following steps: (A) subjecting a peanut protein powder to alkali dissolution and acid precipitation to obtain a peanut protein isolate having a peanut protein mass fraction of 89% to 98%, and (B) treating the peanut protein isolate produced in (A) to obtain a peanut protein dispersion comprising peanut protein at a mass fraction of 17% to 23%; and wherein in the step (a) (iii), the cross-linking reaction is performed under the following conditions: in a water bath at 42° C. to 47° C. to obtain the cross-linked reaction product; and in the step (a)(iv), the cross-linked reaction product is heated at 90° C. to 100° C. after the cross-linking reaction is completed to obtain the monolithic gel.

8. The method of claim 7, wherein in step (a) (ii), 12 to 40 U transglutaminase per gram is added to the amount in grams of the peanut protein dispersion which corresponds to the amount in grams of the peanut protein isolate from which the peanut protein dispersion was obtained.

9. The method of claim 7, wherein in step (a) (ix), the particles in the microgel comprising the peanut protein particle dispersion have a hydrodynamic diameter of 100 nm to 300 nm; and the pH is adjusted to a pH of 2 to 4 or to a pH of 8 to 10.

10. The method of claim 7, wherein in step (c) (ii), the shearing is performed at a speed of 2,000 rpm to 4,000 rpm.

11. A margarine substitute comprising added trans-resveratrol prepared by the method of claim 7, wherein in the high internal-phase Pickering emulsion which comprises the peanut protein particle dispersion and the edible oil obtained in step (c) (ii), the mass fraction of the peanut protein particle dispersion is 0.5% to 2%; and the mass fraction of the edible oil is 74% to 87%.

12. A margarine substitute comprising added trans-resveratrol prepared by the method of claim 7, wherein in the high internal-phase Pickering emulsion which comprises the peanut protein particle dispersion and the edible oil obtained in step (c) (ii), the mass fraction of the peanut protein particle dispersion is 1% to 2%; and the mass fraction of the edible oil is 80% to 87%.

* * * * *